Oct. 23, 1962
A. G. HUPP
3,059,859
SPRAYING APPARATUS
Filed Oct. 30, 1958
2 Sheets-Sheet 1
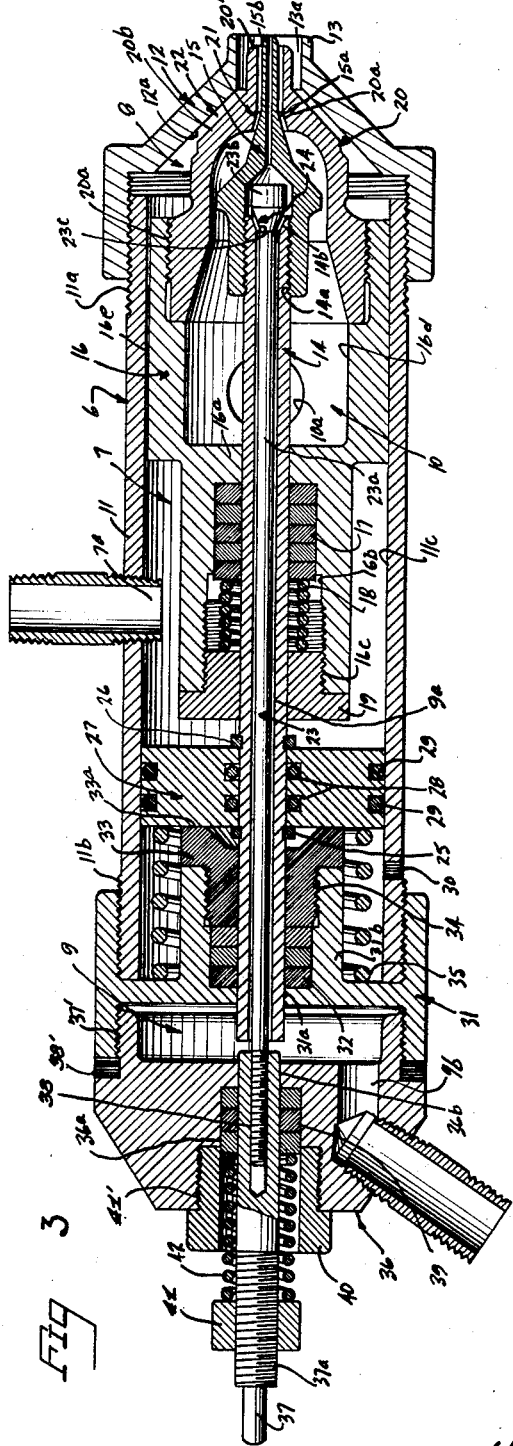
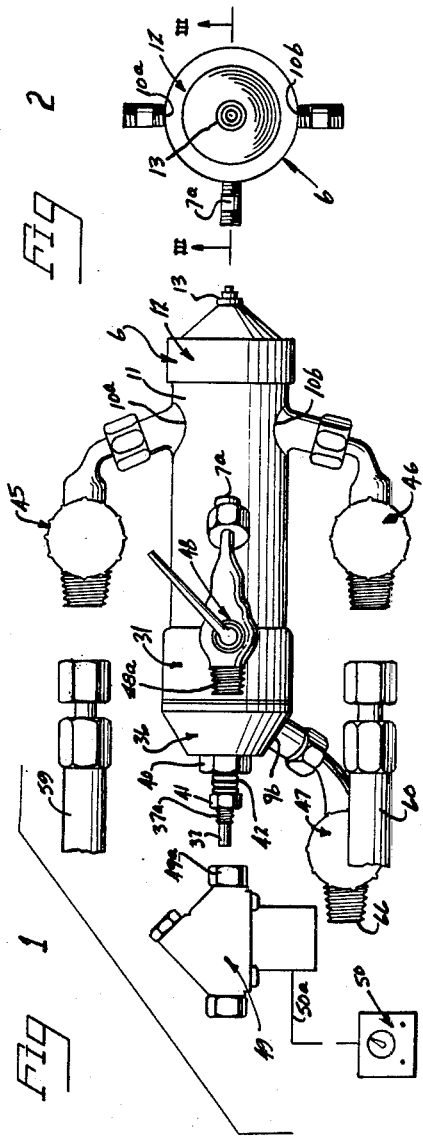
Inventor
ARLEIGH G. HUPP

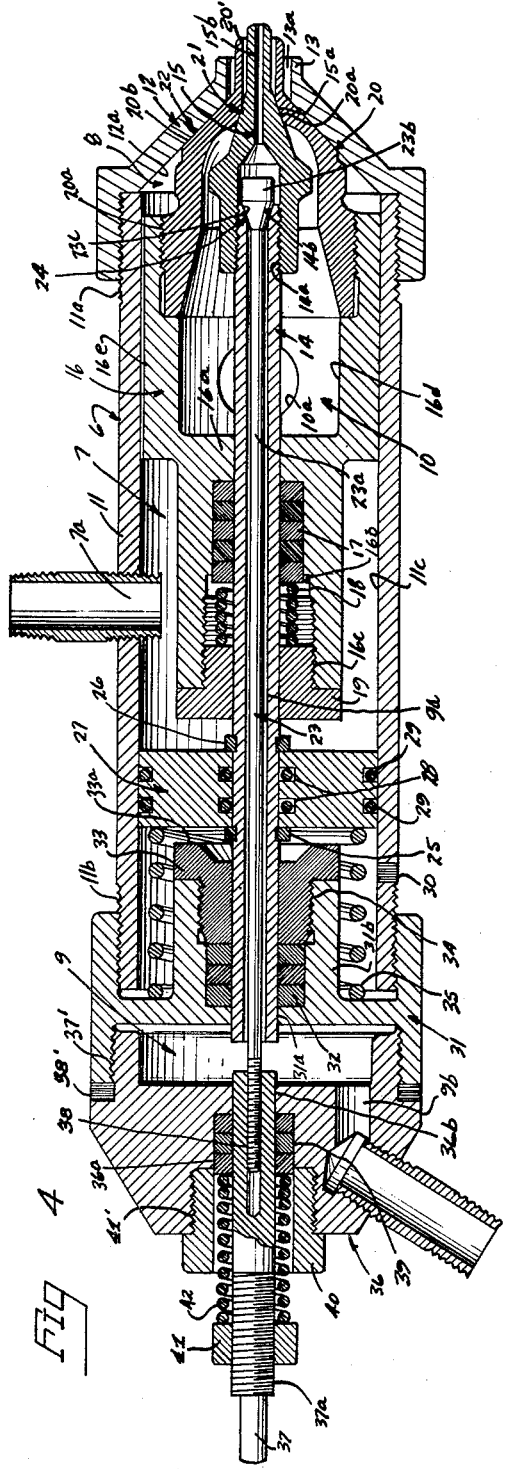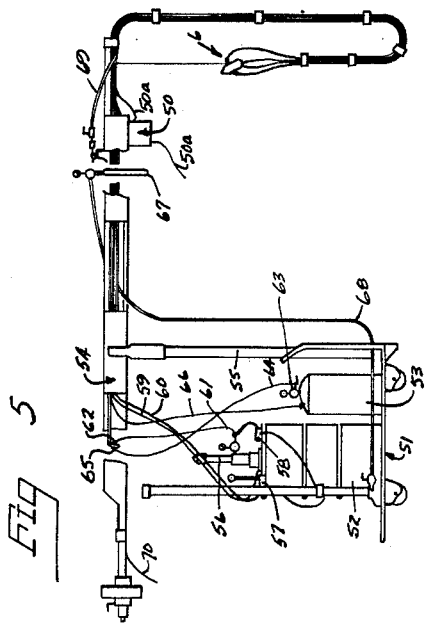
Inventor
ARLEIGH G. HUPP

United States Patent Office 3,059,859
Patented Oct. 23, 1962

3,059,859
SPRAYING APPARATUS
Arleigh G. Hupp, Sarasota, Fla.
Filed Oct. 30, 1958, Ser. No. 770,720
7 Claims. (Cl. 239—422)

The present invention relates to a method and apparatus for spraying fluid substances which fluids may be mixed and deposited upon a given surface. More particularly, the present method and apparatus lends itself to spraying, mixing and depositing fluid catalyst and resinous materials.

The present invention is further concerned with providing a continuous stream of resinous material completely encompassing a continuous stream of catalyst material projected through the center thereof and the combination of means so arrayed as to provide for an encompassing multilateral stream of air directed parallel to the resin and catalyst stream which it encompasses, or at a slight closing angle on all sides of the combined stream which it encompasses. This air stream can be bilateral or unilateral of the resin-catalyst stream and may not in some cases totally encompass said stream. The air stream is used in some cases to aid in mixing the entrained inner streams, to direct and project the entrained streams, to cross-cut and to break up the stream into droplets, or otherwise affect the physical conformation of the entrained resin-catalyst streams. This resin-catalyst stream may have no air directed to encompass it or brought to bear upon it, in which case it would advance after leaving the gun as a continuous stream. When the air is advanced, the resin-catalyst stream may be broken up into droplets; when still further advanced the entrained resin-catalyst stream may be broken up in fine particles or atomized and through varying angular application of air and pressure, caused to effect several spray patterns.

The method and apparatus of the invention have particular applicability to the manufacture of resinous materials such as a polyester resin and an accelerator mixture, to which a catalyst, such as peroxide, must be added to produce a plastic. Another example is the foam-in-place polyurethanes in which a polyester resin, water and an accelerator are mixed to provide the here described "resin side," to which a catalyst, such as di-isocyanate, is added to effect foaming into a comparatively rigid plastic. Another example is where the epoxy resins, such as an "Epon" material here described as the "resin side" are mixed with a catalyst, such as an amine, metals, alkalies, organic bases, acid anhydrides and compounds containing active hydrogen to effect a resultant plastic. It is anticipated that other similar materials may also be used.

The method and apparatus of the present invention lend themselves particularly well to shaping processes such as (1) spraying a liquid resin onto the surface of a mold followed by the application of discrete cut glass fiber strands, or (2) applying an entrained stream of cut glass fibers and a plastic material by means of the instant apparatus and a glass breaker depositor. The components are then combined into a more condensed form by (1) rolling them with a roller, or (2) causing a match mold or vacuum bag to press upon the material and densify the random form into a pre-described plastic shape. Finally the coating is set into rigid form by the evaporation of solvents, heat, pressure and/or other means normally employed to harden the resin involved.

Some difficulty has been experienced in securing a uniform mixture of materials for application in the manner described previously. Machines which have heretofore been employed for the purpose frequently impress a stream of catalyst at an angle to a stream of plastic to by impression, direction and velocity obtain a mix of the two. Other machines have been used to form an atomized spray of the resin and an atomized spray of the catalyst to produce an intermix in the air outside the gun. None of these can assure a consistent intermix. Furthermore health hazards to the operator can result from spraying catalysts in the open air without elaborate protective equipment.

With the foregoing in mind, an object of the present invention is to provide an improved apparatus and method of operation for protecting the health of the operator of the resin depositor as well as the health of workmen adjacent to the spray operation by encompassing the catalyst with the resin.

Another object of the invention is to mechanically insure precise, consistent mixing of materials by encompassing the catalyst with the resin in a linear projection of each.

A further object of the invention is to provide a method for more efficiently depositing resin materials.

Still another object of the invention is to provide a completely portable hand held resin depositing apparatus.

Yet another very important object of the present invention relates to a new and improved fluid spraying system which saves labor and permits the spraying operation to be more efficiently and more accurately carried out through the rise of a single depositor which not only emits a multiplicity of streams with the catalyst stream being protectively encased by a resin stream, but in addition, is provided with means for directing an air stream at the multiplicity of streams to mix the multiplicity of streams and to form it into droplets or fine particles.

Yet another object of the present invention relates to a new and improved catalyst resin spraying system which more readily and accurately permits the catalyst and the resin to be discharged together according to a predetermined fixed ratio and which also permits the rate of discharge to be altered without variation of the aforesaid ratio thereby permitting a better controlled spraying operation of fluids according to a fixed ratio.

An important feature of the present invention relates to a fluid sprayer for spraying at least three substances such as catalyst, resin and air and with the sprayer provided with a single control, here constituting an air valve, adapted for turning the sprayer on-and-off.

Still another important feature of the present invention relates to a fluid sprayer having an air operated piston which is coordinated with catalyst and resin valves permitting catalyst and resin streams to be discharged according to the position of the piston.

Yet another important feature of the present invention relates to a fluid sprayer adapted to discharge fluids, such as resin and catalyst streams according to a fixed ratio, and which sprayer has a single control permitting the rate of flow of the fluids to be varied while maintaining the ratio of the fluids with respect to one another.

Other objects and features of the present invention will be apparent to those skilled in the art from the following description of the attached sheets of drawings which illustrate a preferred embodiment of a resin depositor assembly.

FIGURE 1 shows a generally portable resin depositor assembly without supportive equipment;

FIGURE 2 is a front view of the resin depositor;

FIGURE 3 is an enlarged cross-sectional view of the depositor taken substantially on line III—III of FIGURE 2 with all valves shown in closed position and with its piston 27 shown locked forwardly and rearwardly by adjustments;

FIGURE 4 is an enlarged cross-sectional of the depositor similar to FIGURE 3 only with the components disposed in their respective positions when the depositor is discharging fluids; and FIGURE 5 is a diagrammatic view of the depositor coupled with one array of supporting equipment for a totally portable unit.

The reference numeral 6 indicates generally a depositor or fluid spraying gun or device which is adapted to spray a multiplicity of streams of fluid which fluids may be of any suitable type. The depositor 6 is particularly adapted to spray catalyst and resin whereby the resin stream encases the catalyst stream. The resin due to the character of its molecular structure tends to act as an impervious barrier to positively encase the central or catalyst portion of stream so the catalyst is prevented from escaping. The spraying process is then rendered safer for surrounding workers for the catalyst can be harmful to a worker when it contacts human skin or is inhaled.

Air is also adapted to be sprayed from the depositor as an air stream which in the illustrated form provides a stream which encases the catalyst and resin stream. The air stream may be adapted to intercept the catalyst-resin stream a predetermined distance from the depositor adjacent the workpiece so that the catalyst-resin stream may be divided into fine particles such as droplets or even finer particles such as would be produced by atomizing the stream. The depositor 6 is provided with a series of chambers including axially spaced air chambers 7 and 8, catalyst chamber 9, and resin chamber 10 all of which are enclosed within a main tubular housing 11. The housing 11 is provided with external threads 11a and 11b at opposite ends. Threadingly secured at one end of the housing 11 with threads 11a is an air adjustment cap 12. The air adjustment cap 12 is provided with a central fluid nozzle 13 having an opening or passage 13a constituting a spray discharge nozzle through which passes catalyst, resin and air.

Disposed centrally of the housing 11 is a tube valve member 14 which extends the full length of the housing 11 and is externally threaded at 14a. Threadingly secured with the threads 14a is a tubular resin fluid valve member 15. Also mounted on tube valve member 14 is a tubular sub-housing member 16 and the tube valve member extends longitudinally or axially through a partition wall 16a. The member 16 includes a cup-shaped housing wall 16b at the axially upstream end which is threaded at 16c. Seals 17 are mounted on the tube valve member 14 within the cup-shaped housing wall 16b and are engaged against the partition wall 16a. A spring 18 is disposed between the seals and a threaded cap 19 which cap is threadingly engaged with the threads 16c. The cap 19 bears against the spring 18 to place the seals under pressure and prevent leakage between the air and resin chambers 7 and 10.

The sub-housing member 16 is also provided with a second cup-shaped housing wall 16d disposed axially upstream thereof adjacent the cap 12 and which wall 16d cooperates with a second tubular fluid sub-housing member 20 together defining the resin chamber 10. The resin chamber has a resin inlet 10a and a resin outlet 10b. The housing member 20 is provided with external threads 20a which are threadingly engaged with the member 16 to sustain them in assembly together. The resin fluid valve member 15 is enclosed within the tubular housing member 20 and cooperate together to provide a resin fluid valve 21. The valve 21 is defined by an annular beveled surface or valve face 20a on the housing member 20 and an annular beveled surface or valve face 15a on the external surface of a needle-like catalyst nozzle 15b. The nozzle 15b is integral with the member 15 and extends axially into the nozzle passage 13a on the cap 12.

An air valve 22 is disposed adjacent the cap 12 and the member 20 and is defined by annular beveled surfaces or valve faces 12a and 20b.

Telescoped within the tube valve member 14 and the fluid valve member 15 is an adjustable reverse acting needle valve assembly 23 including a needle shaft 23a and a cap 23b. A catalyst valve 24 is disposed between the cap 23b and the tube valve member 14 which is defined by annular beveled surfaces or valve faces 23c and 14b. The shaft 23a is of a smaller outside diameter than the bore of the tube valve member 14 and defines an annular catalyst passage 9a linking the catalyst chamber 9 with the catalyst valve 24.

Fixedly secured to the tube valve member 14 by snap rings 25 and 26 is an axially movable ring type piston 27 which may be made from any suitable material such as synthetic plastic and is disposed in air chamber 7. The piston engages the inner housing wall 11a in the course of its axial travel and has pairs of ring type gaskets 28 and 29 preventing fluid flow axially of the piston 27. The piston is movable axially in the air chamber 7 in response to air pressure introduced through air inlet 7a. The air introduced into the air chamber 7 may pass through the air chamber 7 into the air chamber 8 by means of a groove 16e in the sub-housing member 16. On the downstream side of the piston 27 is an air outlet 30 to permit air to pass during the movement of the piston 27.

Threadingly secured to the outside surface of the housing 11 by means of the threads 11b is a tubular flow adjustment cap 31. The tube valve member 14 extends through a central cap passage 31a and the cap 31 is provided with a cup-shaped flange 31b which is centered on the passage 31a and is radially spaced from the housing wall 11a and the tube valve member 14.

Disposed between the cap wall 31a, the cap flange 31b and the tube valve member 14 are seals 32 which seal the catalyst chamber 9 from the piston 27. A tubular piston stop block 33 is threadingly engaged at 34 with the radially inner surface of the cap flange 31b and is provided with an annular piston surface or stop 33a which limits the axial movement of the piston 27.

A spring 35 is located radially outwardly of the cap flange 31b between the cap wall 31a and the piston 27 which urges the piston away from the cap wall 31a towards the nozzle 13.

A tubular rear fluid or catalyst housing member 36 is in threaded assembly at 37' with the flow adjustment cap 31 and together define the catalyst chamber 9. The housing 36 is provided with a catalyst inlet 9b linked with catalyst chamber 9. An annular ring seal 38' is disposed between the cap 31 and the housing member 36 to prevent leakage of catalyst fluid.

The tubular catalyst housing member 36 has a stepped cup-shaped surface 36a which is centered on a central passage 36b. A shaft 37 extends through the passage 36b and is secured in threaded assembly at 38 with the needle shaft 23a. Seals 39 are disposed between the shaft 37 and the stepped surface 36a to prevent leakage of catalyst fluid. A tubular cap 40 is engaged in threaded assembly at 41' with the housing member 36. The shaft 37 is externally threaded at 37a and a nut 41 is secured thereon. Disposed between the nut 41 and the seals 39 is a spring 42 which operates to place the seals under pressure and provides means for controlling the relative axial position of the cap 23b and its valve face 23c.

Provided externally of the depositor 6 but mounted thereon for ready access are a series of flow control valves (FIGURE 1) including resin inlet and outlet flow control valves 45 and 46 which may be of any suitable construction and are linked with resin chamber inlet 10a and outlet 10b. Also mounted externally on the depositor is a catalyst flow control valve 47 linked with catalyst inlet 9b and a master shut off valve 48 linked with air inlet 7a. Also provided on the depositor as optional equipment is an electrically operated solenoid valve indicated generally at 49 which has a nut 49a for attachment to threaded female portion 48a of the master control valve 48. The solenoid valve 49 is connected to an electrical timer 50 by an electrical line 50a and operates in a manner which will hereafter be described.

The instant spraying device 6 is adapted to be used with a portable cart 51 which carries resin and catalyst tanks 52 and 53. A swingable boom 54 is pivotally connected to a supporting arm 55 carried by the cart 51.

The resin chamber is part of a resin circulating system for circulating resin through the resin chamber at all times. This system includes the resin tank 52 and is provided with a pump 56, a back pressure regulator 57, an agitator 58 along with the suitable controls. Fluid lines 59 and 60 transmit and return the resin between the resin tank 52, the depositor 6 and these lines are supported on the swingable boom 54. The pump 56 has an air line 61 connected with the main air source at 62.

The catalyst tank 53 is provided with a pump and air regulator assembly 63 and an air line 64 is connected to the main air source at 65. The tank 53 also has a fluid transmission line 66 connected to the depositor 6.

Mounted on the boom 54 is an air transformer 67 which is connected to an air hose air transformer line 68 and an air line 69 connected to the depositor or gun 6 upstream of the control valve 48. The main air source line is indicated at 70.

*Operation*

The apparatus on the cart 51 provides means for transmitting fluids under pressure through the fluid lines to the gun 6 including air, catalyst and resin.

When the gun 6 is not in use, the spring 35 tends to urge the piston 27 towards the nozzle 13. Since the piston 27 is fixedly attached to the tube valve member 14 and further since resin valve face 15a is movable with the tube valve member the resin valve 15 is closed by the spring urged movement of the piston 27. This same spring urged movement also serves to close the catalyst valve 24 since catalyst valve face 14b is moved against the catalyst valve face 23c on the cap 23b which is part of the adjustable needle valve 23 which is normally maintained in a fixed position unless it is adjusted by manipulation of the nut 41 at the opposite end of the gun 6. The upstream movement of the spring urged piston 27 also operates to close the air valve 22 since the air valve face 20 is moved against the air valve face 12a on the air adjustment cap 12. FIGURE 4 shows all of the valves closed and the piston is in a locked position while FIGURE 3 shows the valves all in an open position permitting fluid flow through the nozzles.

When it is desired to actuate the depositor, catalyst under pressure is introduced into the catalyst fluid chamber 9. Adjustment nut 41 is rotated to the right or to the left until the spring pressure from the spring 42 cuts off the flow of catalyst through catalyst nozzle 15b. The flow adjustment cap 31 is rotated to the left which rotates the entire rear assemblage of the apparatus and changes the position of the piston stop 33a to a new rearward position. When pressurized air is introduced into the air chamber 7 sufficient to move the piston 27 against the stop 33a catalyst will flow through the catalyst nozzle 15b. This flow may be weighed and rated in grams per minute and in several initial adjustment steps the desired mass rate may be obtained. The catalyst flow is then cut off by means of an external valve which may be carried by the cart 51 and pressurized resin is introduced into resin fluid chamber 10. Air pressure is again introduced into air chamber 7 and resin flows through resin nozzle 20′ when the resin valve 21 is open as a consequence of the movement of the piston 27. It is in this manner that the resin may be allowed to flow from the nozzle 20′ and the resin discharged may be weighed and rated in grams per minute and in several initial adjustment steps the desired mass rate may be obtained. By making the desired adjustments the resin and catalyst may be discharged from the gun 6 according to a given predetermined ratio.

After the adjustments have been made, the gun 6 may be operated by opening the master air control valve 48 to admit pressurized air into the air chamber 7 through the air inlet 7a. The air flows through the groove 16e into the forward air chamber 8.

When air is introduced under pressure into air chamber 7 sufficient to overcome the spring 35, the piston 27 moves rearwardly against the stop 33a and the fluid valves 15, 22 and 21 are then opened. Resin is circulated through the chamber 7 at all times during the operation by means of a resin circulating system, as previously described.

The flow rate may be simply adjusted by rotating flow adjustment cap 31 to the left to increase the flow of both catalyst and resin, or to the right to decrease the flow of both catalyst and resin, and this may be done without disturbing the predetermined, established ratio between catalyst and resin as was previously fixed. The air adjustment cap 12 may be opened by turning it away from the valve member 20 to apply air to affect the physical nature of projected fluids to break up the stream into fine particles such as droplets or into varying degrees of atomization. It will be appreciated the cap 12 need not be opened after its position has been set to break up the stream as desired, since the valve 22 may be opened or closed by master control valve 48. In other words by adjusting the relative position of the air valve faces 20b and 12a, the valve 22 may be opened and closed according to the position of the slidable piston 27 so that when the air supply is cut off by the valve 48 the valve 22 will be closed.

The solenoid control valve 49 and the timer 50 provide alternative means of control to aid setting the ratio of resin to catalyst. It should be appreciated the operation of the gun 6 is not dependent upon these controls since the ratio will be established according to the procedure previously described. However, where the solenoid valve and timer are installed, the amount of material deposited over a given area in a given time can be predicted and accurately deposited. Thus where it is desired that an area to be sprayed should have a predetermined number of grams of resin and catalyst deposited thereon, the timer 49 and the solenoid valve 50 are useful in attaining this end.

The timer, for example, may be set for 20 seconds and the solenoid will open the air valve after a timer control switch is closed and spray resin and catalyst on a surface for 20 seconds whereupon the solenoid valve will cut off the air pressure into air chamber 7 and the catalyst and resin flow will stop. The surface bearing the catalyst and resin may be weighed and the flow rate may be determined in grams of material deposited per second. Where a series of articles are to be sprayed, the gun may be operated by the timer 50 so that the same amount of catalyst and resin according to a predetermined ratio will be deposited on each of the articles being sprayed. It is in this manner that the gun 6 may be operated in a high speed controlled spraying operation with a minimum of labor.

It will be understood that modifications and variations may be effected without departing from the scope of the novel concepts of the present invention.

I claim as my invention:

1. In a fluid spraying device for spraying a plurality of fluid streams with one of the streams encased within another of the streams, radially related nozzles mounted co-axially with respect to one another, fluid chambers disposed upstream of the nozzles with each of the nozzles being in communication with one of the fluid chambers, shut-off valves between each of the chambers and its associated nozzle, a slidable piston connected to said shut-off valves for opening and closing of the said shut-off valves, a nozzle cap threaded on said device, a piston stop disposed on one side of said piston, spring means urging said piston away from said piston stop, an air chamber disposed on the opposite side of the piston, and an air nozzle in communication with the air chamber disposed co-axially of said radially related nozzles whereby the pressurized air injected into the air chamber operates to move said piston towards said piston stop overcoming the force of the spring means and thereby operate said shut-off valves, said cap being adjustable on its threads for varying the size of an air discharge orifice defined by the air nozzle.

2. The device of claim 1 further characterized as having flow control valves in communication with the fluid chambers for catalyst and resin permitting the catalyst and resin to be discharged according to a selected ratio, and a master flow control valve on the device operatively connected with said air chamber and with said piston for varying the rate of flow of the catalyst and resin from the discharge nozzles without varying the selected ratio.

3. In a fluid depositing and mixing device, means on the device defining separate chambers for air, catalyst and resin, means for discharging a single combined unmixed stream of air, catalyst and resin comprising a series of coaxial air catalyst and resin nozzles each in communication with one of said chambers, the resin nozzle disposed radially between said catalyst and air nozzles, valve structure including catalyst and resin shut-off valves between the catalyst and resin chambers and their nozzles, means for operating the shut-off valves, the last mentioned means being operated to open the valves by pressurized air flowing through the chamber for air and actuating the same and a single master air control valve on said device to shut off the air to said chamber for air and with said means for operating the shut-off valves then operating to close said catalyst and resin shut-off valves and thereby prevent discharge of air, catalyst and resin from said nozzles.

4. In a fluid spraying device for spraying a plurality of fluid streams with one of the streams encased within another of the streams, three radially related nozzles mounted coaxially with respect to one another with the outermost of said nozzles being for discharge of air, air and fluid chambers disposed upstream of the nozzles with each of the nozzles being in communication with one of the chambers, shut-off valves between each of the chambers and its associated nozzle, a slidable piston connected to said shut-off valves for opening and closing of the said shut-off valves, spring means urging said piston in a direction to effect closing of said valves, and means for causing pressurized air to be injected into the air chamber and to move said piston in an opposite direction overcoming the force of the spring means and thereby open said shut-off valves to permit air and fluid to flow from said chambers through said nozzles.

5. The device of claim 4 further characterized as having flow control valves in communication with the fluid chambers permitting the fluids to be discharged according to a selected ratio, and a master flow control valve on the device operatively connected with said air chamber and with said piston for varying the rate of flow of the fluids from the discharge nozzles without varying the selected ratio.

6. In a fluid spraying device for spraying a plurality of fluid streams with one of the streams encased within another of the streams, three radially related nozzles mounted coaxially with respect to one another with the outermost of said nozzles being for discharge of air, air and fluid chambers disposed upstream of the nozzles with each of the nozzles being in communication with one of the chambers, shut-off valves between each of the chambers and its associated nozzle, a slidable piston connected to said shut-off valves for opening and closing of the said shut-off valves, spring means urging said piston in a direction to effect closing of said valves, means for causing pressurized air to be injected into the air chamber and to move said piston in an opposite direction overcoming the force of the spring means and thereby open said shut-off valves to permit air and fluid to flow from said chambers through said nozzles, and means for varying the rate of discharge from said three nozzles comprising a nozzle cap movably secured to the device for varying the area of opening of the air nozzle and flow control valves operatively connected to the other two of said nozzles for varying the catalyst and resin ratio.

7. The device of claim 1 further characterized by shut-off means comprising a solenoid valve being operatively connected to said air chamber receiving pressurized air and for closing the air operated catalyst and resin shut-off valves, and a timer cooperable with said solenoid valve permitting fluids to be discharged from the nozzles for a selected period of time whereupon the solenoid valve stops the pressurized air flow and the spring means closes the shut-off valves to stop fluid flow from the nozzles.

References Cited in the file of this patent

UNITED STATES PATENTS

| | | |
|---|---|---|
| 1,199,734 | Dunn | Sept. 26, 1916 |
| 1,425,333 | Parker et al. | Aug. 8, 1922 |
| 1,829,661 | Krautzberger | Oct. 27, 1931 |
| 2,186,214 | Simon | Jan. 9, 1940 |
| 2,265,209 | Thompson | Dec. 9, 1941 |
| 2,266,365 | Harrison | Dec. 16, 1941 |
| 2,335,116 | Hansen | Nov. 23, 1943 |
| 2,506,936 | Murray | May 9, 1950 |
| 2,511,797 | Hochberg | June 13, 1950 |
| 2,780,496 | Asbeck | Feb. 5, 1957 |
| 2,798,765 | Wilson | July 6, 1957 |
| 2,864,653 | Liedberg | Dec. 16, 1958 |
| 2,971,700 | Peeps | Feb. 14, 1961 |

FOREIGN PATENTS

| | | |
|---|---|---|
| 163,640 | Australia | June 27, 1955 |
| 566,543 | Great Britain | Jan. 3, 1945 |
| 802,128 | France | June 6, 1936 |
| 1,130,539 | France | Oct. 1, 1956 |